United States Patent
Yun

(10) Patent No.: US 8,271,702 B2
(45) Date of Patent: Sep. 18, 2012

(54) MEMORY ALLOCATION METHOD FOR DIRECT MEMORY ACCESS AND TERMINAL THEREFOR

(75) Inventor: Sung Hwan Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 12/401,341

(22) Filed: Mar. 10, 2009

(65) Prior Publication Data

US 2009/0228617 A1 Sep. 10, 2009

(30) Foreign Application Priority Data

Mar. 10, 2008 (KR) .................. 10-2008-0022032

(51) Int. Cl.
*G06F 3/00* (2006.01)
*G06F 5/00* (2006.01)
(52) U.S. Cl. ............... 710/56; 711/170; 345/543
(58) Field of Classification Search .............. None
See application file for complete search history.

(56) References Cited

U.S. PATENT DOCUMENTS

| | | | | |
|---|---|---|---|---|
| 6,035,349 | A * | 3/2000 | Ha et al. ................... | 710/68 |
| 6,581,148 | B1 * | 6/2003 | Sadashivaiah et al. ....... | 711/170 |
| 6,804,761 | B1 * | 10/2004 | Chen et al. ................. | 711/170 |
| 6,922,740 | B2 * | 7/2005 | Kondratiev et al. .......... | 710/22 |
| 7,099,685 | B2 * | 8/2006 | Park et al. .................. | 455/550.1 |
| 7,552,306 | B2 * | 6/2009 | Madhavarao et al. ........ | 711/170 |
| 2005/0289253 | A1 * | 12/2005 | Edirisooriya et al. ......... | 710/22 |
| 2007/0162638 | A1 * | 7/2007 | Ko et al. .................... | 710/22 |
| 2007/0245041 | A1 * | 10/2007 | Hua et al. ................... | 710/22 |
| 2008/0222380 | A1 * | 9/2008 | Sze et al. ................... | 711/170 |

FOREIGN PATENT DOCUMENTS

EP 0 374 074 A2 6/1990

* cited by examiner

*Primary Examiner* — Elias Mamo
(74) *Attorney, Agent, or Firm* — Jefferson IP Law, LLP

(57) ABSTRACT

A memory allocation method and terminal for supporting Direct Memory Access (DMA) are provided. The terminal includes a memory for storing data used for operations of the terminal, a plurality of devices for executing applications for specific functions, a control unit for defining, when the terminal boots up, a virtual zone dedicated for the DMA in the memory, and a DMA unit for controlling the DMA of the devices.

14 Claims, 2 Drawing Sheets

MEMORY ALLOCATION METHOD FOR DIRECT MEMORY ACCESS AND TERMINAL THEREFOR

PRIORITY

This application claims the benefit under 35 U.S.C. §119(a) of a Korean patent application filed in the Korean Intellectual Property Office on Mar. 10, 2008 and assigned Serial No. 10-2008-0022032, the entire disclosure of which is hereby incorporated by reference.

BACKGROUND OF THE INVENTION

1. Field of the Invention

The present invention relates to a memory allocation. More particularly, the present invention relates to a memory allocation method for supporting direct memory access and a terminal implementing the memory allocation method.

2. Description of the Related Art

A terminal, such as a computer or a mobile terminal, is provided with diverse devices for implementing various functions and these functions are executed using application programs stored in memory. The memory is also responsible for storing data generated while the application programs are running. The computer or mobile terminal operates under the control of a Central Processing Unit (CPU). That is, the devices read out the data from the memory to execute specific operations and store the data generated during the execution of the operations within the memory under the control of the CPU. Accordingly, the greater the number of devices there are under the control of the CPU, the greater the CPU overhead increases, resulting in degradation of performance. In order to prevent the performance degradation of the CPU, a Direct Memory Access (DMA) technique has been proposed in which the devices directly access the memory for reading and/or writing independently of the CPU. DMA allows devices to access the memory and transfer data under the control of a DMA controller without subjecting the CPU to a heavy overhead.

The various types of data related to the operations of the terminal are stored within a memory in a distributed manner. That is, although the data are related to the same device operation, they are distributively stored in a specific memory region. The data are stored at their corresponding addresses, referred to by pointers, to be read in a sequence of operations for a specific function. In a case where a DMA device accesses the memory to read the data from the distributed addresses, the next address is automatically acquired by adding one (1) to the previous address rather than a pointer. In other words, a DMA device cannot read the data which are stored distributively in the conventional manner, through the direct access. In order to input and/or output the data in a DMA mode, the data should be stored within the memory in a continuous manner. That is, in order for the device to operate normally, the data are stored at continuous addresses in consideration of the characteristics of DMA. Accordingly, there is a need to develop an efficient memory allocation method that is capable of assigning continuous data addresses to protect from a degradation of CPU performance.

SUMMARY OF THE INVENTION

An aspect of the present invention is to address at least the above-mentioned problems and/or disadvantages and to provide at least the advantages described below. Accordingly, an aspect of the present invention is to provide a memory allocation method for direct memory access and a terminal adopted with the memory allocation method.

In accordance with an aspect of the present invention, a terminal supporting Direct Memory Access (DMA) is provided. The terminal includes a memory for storing data used for operations of the terminal, a plurality of devices for executing applications for specific functions, a control unit for defining, when the terminal boots up, a virtual zone dedicated for the DMA in the memory, and a DMA unit for controlling the DMA of the devices. Preferably, the control unit comprises a virtual zone management module for allocating, when a request for driving a device is input, memory to the device within the virtual zone and for withdrawing, when the operation of the devices completes, the memory allocated for the device. Preferably, the memory unit comprises a normal zone for storing data associated with normal operations of the terminal and a DMA zone for storing data associated with DMA operations and continuously stores the data associated with the DMA operations within the virtual zone allocated for the devices.

In accordance with another aspect of the present invention, a method of DMA for a terminal is provided. The method includes defining, when the terminal boots up, a virtual zone for a plurality of devices executing DMA applications in a memory, allocating, when one of the plurality of devices is requested for an operation, a part of the virtual zone for the device, and withdrawing, when the operations completes, the part of the virtual zone.

The features and technical advantages of the present invention are described above in short to help those skilled in the art understand the principles and practices of the present invention. These and other features and advantages of the present invention will become more fully apparent from the following description and appended claims, or may be learned by the practice of exemplary embodiments of the invention as set forth hereinafter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defines by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
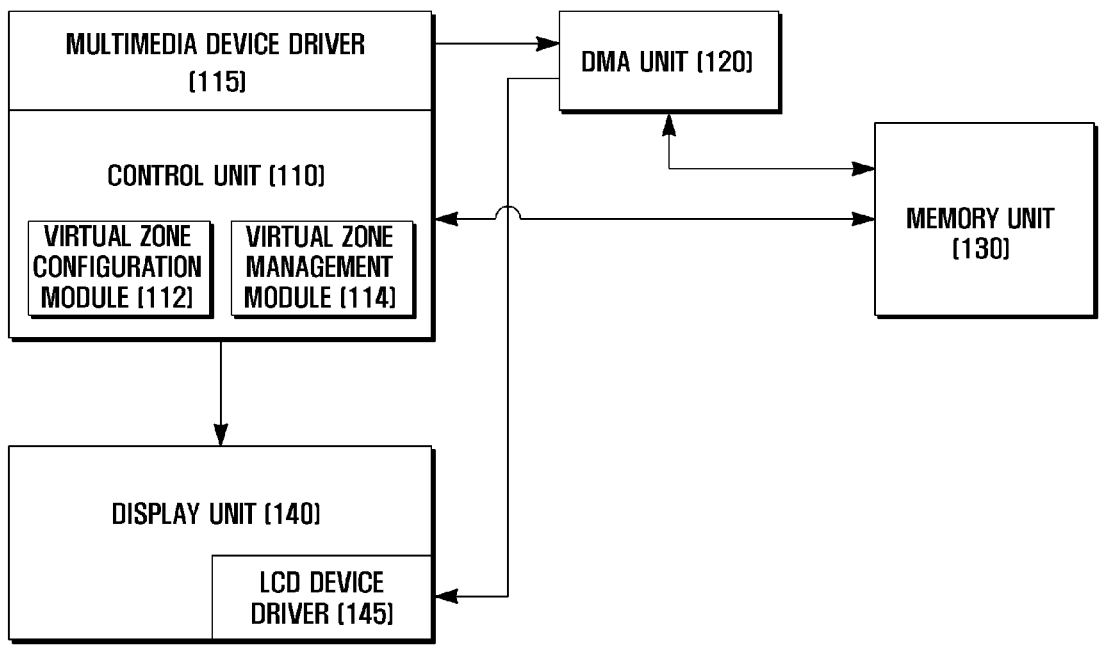
FIG. 1 is a block diagram illustrating a configuration of a terminal according to an exemplary embodiment of the present invention.

FIG. 1 is a block diagram illustrating a configuration of a terminal according to an exemplary embodiment of the present invention. The terminal may be any of fixed and mobile devices supporting Direct Memory Access (DMA) for writing and reading data to and from a memory. In order to simplify the explanation, exemplary embodiments of the present invention are described with a Smartphone as an example, wherein the Smartphone is a combination of a mobile phone and a Personal Digital Assistant (PDA). The Smartphone is configured to support various functions such as Internet access, digital broadcast playback, video/audio playback, etc. It is assumed that the Smartphone operates with an open source Embedded Linux as its Operating System (OS). However, the present invention can be applied to the devices operating with other OSs, such as Windows CE and Symbian, in which the memory allocation is performed by a Memory Management Unit (MMU).

Referring to FIG. 1, the continuous memory allocation-enabled terminal includes a control unit 110, a DMA unit 120, a memory unit 130, and a display unit 140. In this exemplary embodiment, the present invention is described with a multimedia device driver 115 and a Liquid Crystal Display (LCD) device driver 145 having frequent data input/out features as exemplary DMA devices. Although FIG. 1 is depicted with elements used for the continuous memory allocation such as the multimedia device driver 115 and LCD device driver 145, the terminal can further include other elements for executing various functions.

The control unit 110 is responsible for general operations of the terminal. More particularly, in this exemplary embodiment, the control unit 110 controls the multimedia device driver 115 and the LCD device driver 145 and includes a virtual zone configuration module 112 for configuring, when the terminal boots up, a predefined size of a virtual zone within the memory unit 120 and a virtual zone management module 114 for memory allocation and withdrawal for the devices within the virtual zone. The DMA unit 120 controls such that each device can access the memory unit 130 directly to read and write data. In this exemplary embodiment, the multimedia device driver 115 and the LCD device driver 145 access the memory unit 130 and write and read data to and from the memory unit 130 under the control of the DMA unit 120 rather than the control unit (or Central Processing Unit (CPU)) 110. The DMA unit 120 controls the devices to read and write the data with reference to the device's data addresses provided by the control unit 110. The multimedia device driver 115 includes an element for executing multimedia applications such as a music player, a video player, and a digital broadcast player. The multimedia device driver 115 can be integrated into the control unit 110 or implemented separately. In FIG. 1, the multimedia device driver 115 is included in the control unit 110. Here, the multimedia device driver 115 can be a Multi-standard Video Encode/Decode (MVED) accelerator for processing multimedia data.

The memory unit 130 can be implemented with at least one of Read Only Memory (ROM), Flash memory, and Random Access Memory (RAM). The terminal stores the data related to the system booting in the ROM and the application programs in the flash memory. The RAM is used to temporarily store the data generated while the application programs loaded from the ROM or flash memory operate. Since the DMA operation is associated with RAM, the operation of the memory unit 130 is described with the features of RAM in this exemplary embodiment. The memory 130 is provided with a normal zone for storing data associated with operations of the normal applications and a virtual zone for storing data associated with DMA applications. The display unit 140 displays visual data under the control of the control unit 110. The display unit can incorporate the LCD device driver 145 which executes the application for displaying data on the LCD. The LCD device driver 145 can directly access the virtual zone of the memory unit 130 through the DMA unit 120 to read and write data.

Figure 2:
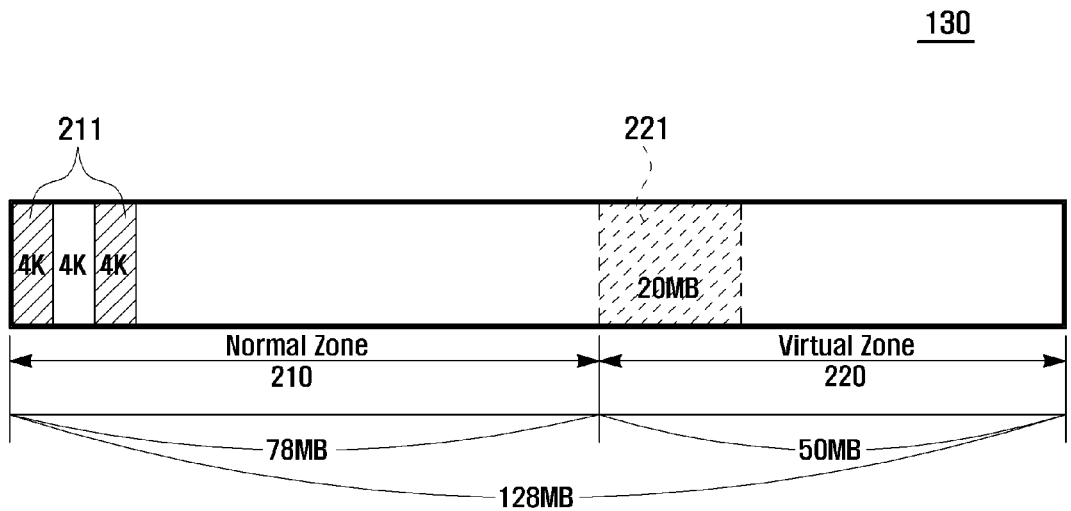
FIG. 2 is a diagram illustrating a structure of the memory unit of the terminal of FIG. 1 according to an exemplary embodiment of the present invention.

FIG. 2 is a diagram illustrating a structure of the memory unit of the terminal of FIG. 1 according to an exemplary embodiment of the present invention.

Referring to FIG. 2, the memory unit 130 includes a normal zone 210 for storing data associated with the normal operation of the terminal and a virtual zone 220 for storing data associated with DMA operations. When the terminal powers up, the virtual zone configuration module 112 of the control unit 110 sets a predefined size of the memory space as the virtual zone 220. The virtual zone 220 is dedicated to the DMA devices. That is, the virtual zone 220 is allocated only for the applications operating in DMA mode, while the normal zone 210 is allocated for the applications operating in a normal memory access mode.

In this example, the memory unit 130 is a total of 128 MegaBytes (MB), and 50 MB of the total memory space is set for the virtual zone 220. Accordingly, the remaining 78 MB memory space becomes the normal zone 210. The sizes of the virtual zone 220 and the normal zone 210 can be changed depending on the system configuration. In the normal zone 210, the data are stored in a conventional memory access manner, i.e. the data are stored in predefined units in a distributed manner. In FIG. 2, the data are stored in units of four (4) Kilobits (K) in the normal zone 210 (see reference number 211). Whereas, since the virtual zone 220 can be allocated continuously by as much as the device requires, the data of a DMA device, i.e. the multimedia device driver 115 or the LCD device driver 145 can be stored within the virtual zone in a continuous manner. As illustrated in FIG. 2, the multimedia device driver 115 or LCD device driver 145 is allocated a predefined size (in this embodiment, 20 MB) 221 of memory space within the virtual zone 220. Since the data of the DMA device are stored at continuous addresses in the virtual zone 220, the device can read the data in a DMA mode, which results in securing stable operation of the DMA applications. It is preferred that the virtual zone 220 is defined with a size large enough for storing data used for DMA of the devices, and the memory block 221 is also defined with a size large enough for the DMA operation of each device. The size of the memory block 221 can be adjusted by the virtual zone management module 114, which controls memory allocation and withdrawal. In this manner, the terminal enables the devices to access the data stored in the corresponding memory block 221 continuously, thereby securing normal operation of the DMA device.

The memory space of the virtual zone 220 is allocated for the operation of a specific device and, when the operation is completed, is withdrawn by the virtual zone management module 114. The withdrawn memory space of the virtual zone 220 can be allocated for the DMA operation of another device. The virtual zone configuration and allocation procedure is described in more detail with reference to FIG. 3.

Figure 3:
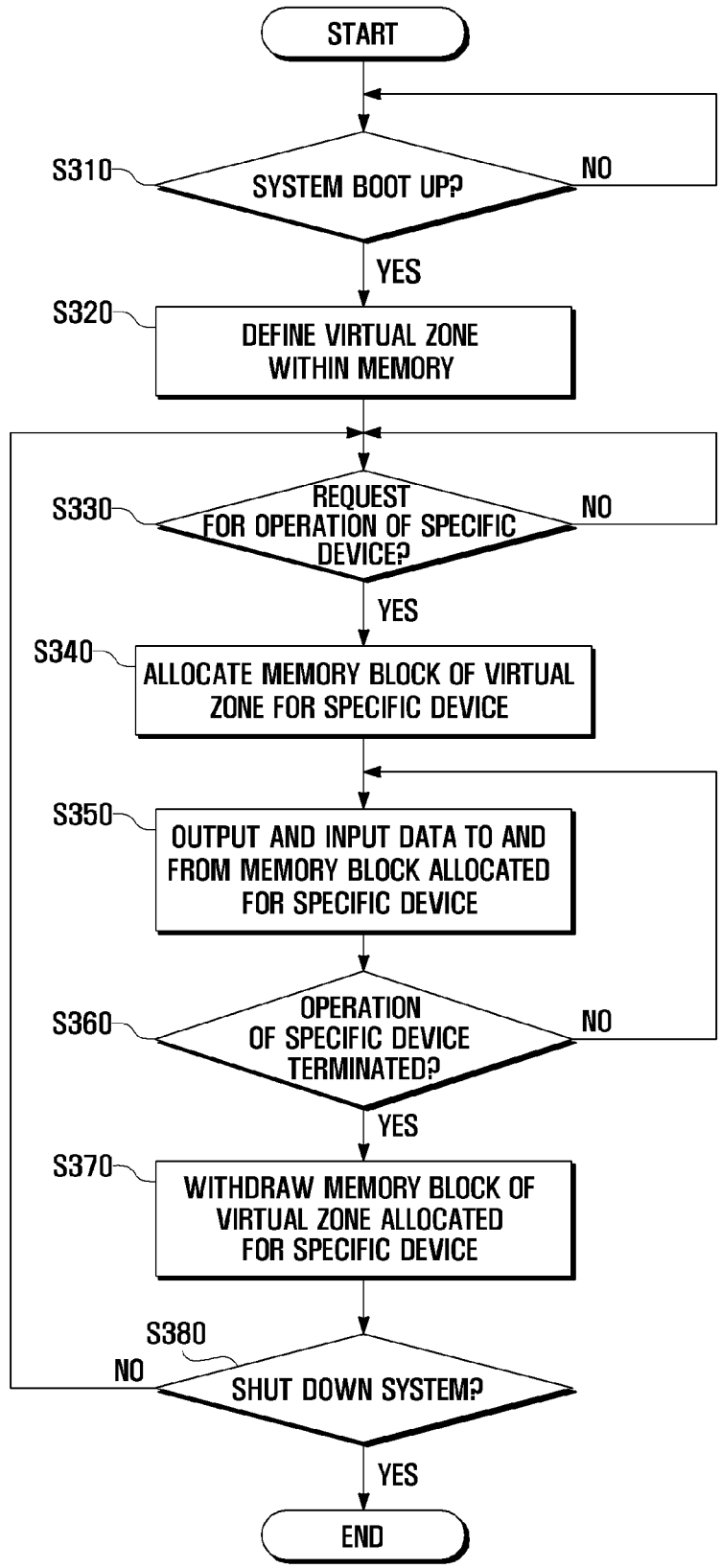
FIG. 3 is a flowchart illustrating a memory allocation method for a terminal according to an exemplary embodiment of the present invention.

FIG. 3 is a flowchart illustrating a memory allocation method for a terminal according to an exemplary embodiment of the present invention.

Referring to FIG. 3, the control unit 110 (see FIG. 1) activates when the system boots up in step S310. Once the system has booted up, the virtual zone configuration module 112 of the control unit 110 configures a predefined size of virtual zone 220 within the memory unit 130 as illustrated in FIG. 2 in step S320. Next, the control unit 110 determines whether there is a request for driving a specific DMA device, e.g. a multimedia device driver or an LCD device driver, in step S330. The device driving request can be input through an input unit (not shown) of the terminal. In this exemplary embodiment, it is assumed that a request for driving the multimedia device driver is detected. If a request for driving the multimedia device driver is detected, the virtual zone management module 114 of the control unit 110 allocates a predefined size of space, i.e. the memory block 221 of FIG. 2, for the multimedia device driver in step S340. Once the memory block 221 is allocated for the multimedia device driver, the multimedia device driver 115 accesses the memory block 221 of the virtual zone to input and output data in step S350. At this time, the multimedia device driver accesses the memory block 221 directly through the DMA unit 120 without control by the control unit 110. The control unit 110 determines whether the operation of the multimedia device driver 115 has terminated in step S360. If the operation of the multimedia device driver 115 has terminated, the control unit 110, i.e. the virtual zone management module 114, withdraws the memory block 221 allocated for the multimedia device driver 115 in step S370 and, otherwise, repeats step S350. Next, the control unit 110 determines whether a system shutdown request is detected in step S380. If a system shutdown request is detected, then the control unit 110 releases the virtual zone 220.

In this manner, the memory allocation method of an exemplary embodiment of the present invention sets a virtual zone dedicated for DMA devices within the memory such that the devices can stably operate in a DMA mode. Since the devices can access the memory to support the frequent input/out operations of DMA applications, it is possible to improve the operation speed of the DMA applications.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

As described above, the memory allocation method for direct memory access according to exemplary embodiments of the present invention improve DMA performance of a terminal by allocating a specific region of memory for DMA devices. In addition, the memory allocation method of exemplary embodiments of the present invention can prevent processing overhead of a CPU and improve operation speed of applications.

What is claimed is:

1. A terminal supporting Direct Memory Access (DMA), the terminal comprising:
    a memory unit for storing data used for operations of the terminal;
    at least one device for executing applications for specific functions;
    a control unit for defining, when the terminal boots up, a virtual zone comprising a predetermined size of unallocated memory dedicated for only the DMA in the memory, for allocating, when a request for driving a device is input, a part of the virtual zone comprising a predefined size of continuous addresses for the device and for withdrawing, when the operation of the device is completed, the part of the virtual zone allocated for the device in the memory; and
    a DMA unit for controlling the DMA of the devices,
    wherein the size of the allocated part of the virtual zone is adjusted according to memory allocation and withdrawal,
    wherein the memory in the virtual zone dedicated for only the DMA cannot be allocated for non-DMA use,
    wherein the devices comprise at least one of a multimedia device for executing a multimedia application and display device for executing a visual application, and
    wherein the device is driven by the request writes and reads data to and from a block allocated within the virtual zone in a DMA mode.

2. The terminal of claim 1, wherein the memory unit comprises a normal zone for storing data associated with normal operations of the terminal and a DMA zone for storing data associated with DMA operations.

3. The terminal of claim 2, wherein the memory unit continuously stores the data associated with the DMA operations within the virtual zone allocated for the devices.

4. The terminal of claim 1, wherein the device driven by the request writes and reads data to and from the block allocated within the virtual zone in the DMA mode directly through the DMA unit without control by the control unit.

5. The terminal of claim 1, wherein the control unit defines the virtual zone in a size large enough for accommodating data associated with the DMA of the devices.

6. The terminal of claim 1, wherein the block comprises a predefined size large enough for accommodating data associated with the DMA of the device, and wherein the control unit adjusts the size of the block.

7. The terminal of claim 1, wherein the control unit releases, when the terminal powers off, the virtual zone.

8. The terminal of claim 1, wherein the DMA unit controls the devices to read and write the data with reference to data addresses of the devices provided by the control unit.

9. A method of Direct Memory Access (DMA) for a terminal, the method comprising:
    defining, when the terminal boots up, a virtual zone comprising a predetermined size of unallocated memory for only at least one device executing DMA applications in a memory;
    allocating, when a device is requested for an operation, a part of the virtual zone comprising a predefined size for the device;
    withdrawing, when the operation completes, the allocation of the part of the virtual zone;

writing and reading the data to and from the part of the virtual zone allocated for the requested device in a DMA mode; and driving one of the devices including a multimedia device for executing a multimedia application and a display device for executing a visual application, wherein the size of the allocated part of the virtual zone is adjusted according to memory allocation and withdrawal, and wherein the memory in the virtual zone dedicated for only the DMA cannot be allocated for non-DMA use.

10. The method of claim 9, wherein the virtual zone is defined in a size large enough for accommodating data associated with the DMA of the devices.

11. The method of claim 9, further comprising storing the data associated with the operation of the requested device at continuous addresses of the part of the virtual zone.

12. The method of claim 9, wherein the writing and reading of the data to and from the part of the virtual zone allocated for the requested device in the DMA mode is performed directly through a DMA unit without control by a control unit.

13. The method of claim 9, further comprising controlling the writing and reading of the data to and from the part of the virtual zone allocated for the requested device in the DMA mode by a DMA unit with reference to data addresses of the requested devices provided by a control unit.

14. The method of claim 9, further comprising releasing, when the terminal shuts down, the virtual zone.

* * * * *